US005692283A

United States Patent [19]

[11] Patent Number: 5,692,283
[45] Date of Patent: Dec. 2, 1997

Olive

[54] PNEUMATIC PRESS FOR FORMING FURNITURE BODIES

[75] Inventor: Juan Guarch Olive, Benicarlo, Spain

[73] Assignee: Prensas Ramarch, S. L., Spain

[21] Appl. No.: 609,981

[22] Filed: Feb. 29, 1996

[30] Foreign Application Priority Data

Oct. 31, 1995 [ES] Spain .................................... 9502759

[51] Int. Cl.[6] .................................................. B23P 19/04

[52] U.S. Cl. ........................... 29/252; 29/281.5; 29/281.3

[58] Field of Search .......................... 29/251, 252, 281.3, 29/281.5; 100/232, 237

[56] References Cited

U.S. PATENT DOCUMENTS 722,853 3/1903 Klaus ..................................... 100/232
3,131,737 5/1964 Pead ..................................... 29/281.3
3,283,699 11/1966 Hawkins ..................................... 29/251
3,537,166 11/1970 Matyas ..................................... 29/281.5
4,547,255 10/1985 Yow ..................................... 100/237
5,174,004 12/1992 King et al. ..................................... 29/251
5,564,176 10/1996 Garcia et al. ..................................... 29/251

*Primary Examiner*—Timothy V. Eley
*Assistant Examiner*—Lee Wilson
*Attorney, Agent, or Firm*—Gary M. Nath; Nath & Associates

[57] ABSTRACT

A press useful for forming furniture such as cabinets includes a determining structure formed by a rectangular frame composed of two vertical columns with as many horizontal cross bars. Incorporated between the two columns are a horizontal and a vertical crosspieces which may be moved by sliding parallel at respective sides of the frame. Each of the mobile cross pieces includes cylinders which are utilized to apply pressure to the work piece.

7 Claims, 4 Drawing Sheets

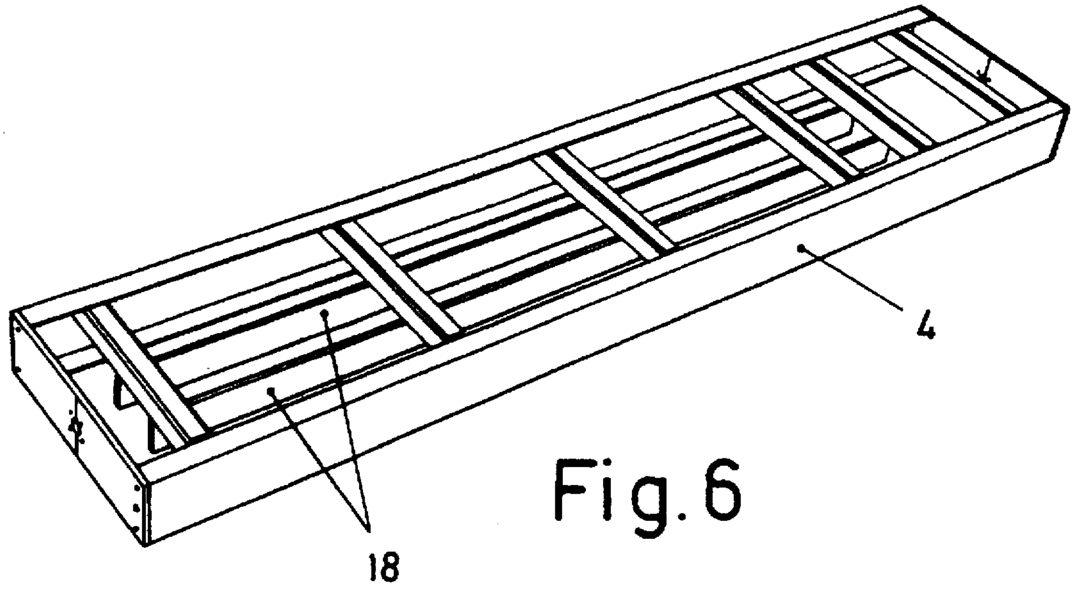
Fig. 6
Fig. 7
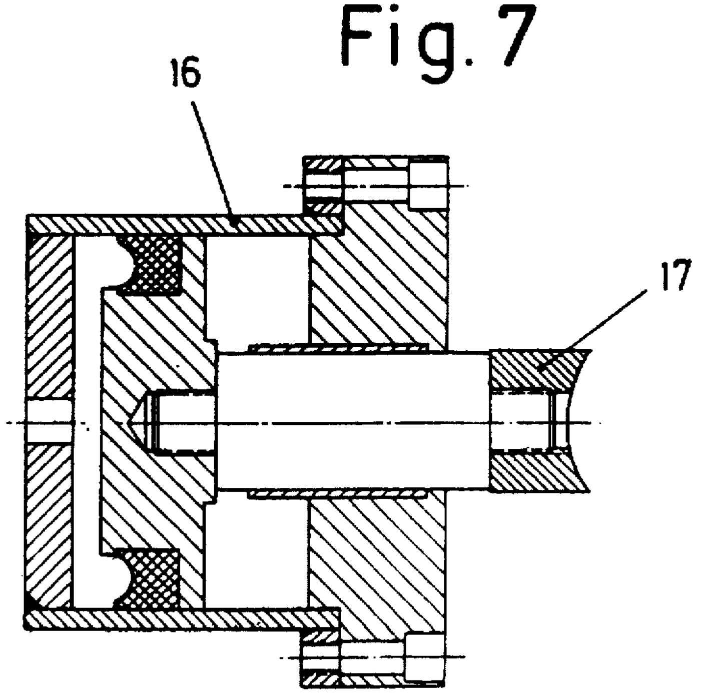

PNEUMATIC PRESS FOR FORMING FURNITURE BODIES

BACKGROUND OF THE INVENTION

In order to make bodies for furniture with a box shape with four perpendicular walls and a bottom, such as are usual for the cabinets of kitchen and bathroom furnishings, or the like, it is necessary to have a tight hold of the constituent elements, all the while keeping the whole square during the phase of joining the aforementioned elements with an adhesive.

For this purpose it is necessary to use holding supports that allow the set of elements to be maintained in the assembly position, at the same time exerting pressure among them for the unions to be effective and the dimensional measurements of the body formed to be correct.

With this goal and with the purpose of providing a practical and effective means of carrying out said operations, according to this invention a press is proposed to this effect, which has been structurally conceived according to constructive and functional features that make it particularly advantageous in the development of the indicated function.

SUMMARY OF THE INVENTION

This press which is the object of the invention basically consists of a determining structure formed by a rectangular frame composed of two vertical columns, with as many horizontal crossbars, incorporated between the two columns, and between the two horizontal columns, as many perpendicular crosspieces which may be moved by sliding parallel to the respective sides of the frame.

Each one of the mobile crosspieces mentioned above incorporates cylinders by means of which pressure may be exerted against the corresponding opposite side of the frame, it being possible to position the aforementioned cylinders, in each one of them, for the adequate distribution of the same along the length of the space in which pressure is to be exerted in each case.

The aforementioned crosspieces may in turned be positioned, by means of their own mobility, to approximate the measurements of the body to be made, it being possible to move and fix the horizontal crosspiece by mechanical driving means, while the vertical crosspiece may be moved manually, being capable of being blocked in selective positions by upper and lower anchoring by means of cylinders on corresponding plates.

In this manner a press of very simple execution is obtained, in which the operating cylinders of the press are of a very reduced length, since the approximation of the mobile crossbeams to the measurements of the bodies to be made leaves only a small margin in which those pressure cylinders must operate, and therefore requiring a very short run length, which makes it possible to achieve great precision in the pressing operation, while the risks of cylinders bulging or twisting are reduced to a minimum.

This press which is the subject of the invention therefore has considerable advantageous characteristics, acquiring a life of its own and a preferred nature for the constructive function for which it is meant.

BRIEF DESCRIPTION OF THE DRAWINGS

FIG. 6 is a corresponding perspective view of the lower horizontal crossbar, which in turn serves as a guide for the aforementioned vertical mobile crosspiece assembly.

FIG. 7 is an enlarged cross-sectional detail of one of the lower blocking cylinders of the aforementioned vertical mobile crosspiece.

DESCRIPTION OF THE PREFERRED EMBODIMENTS

Explanatory details

Figure 1:
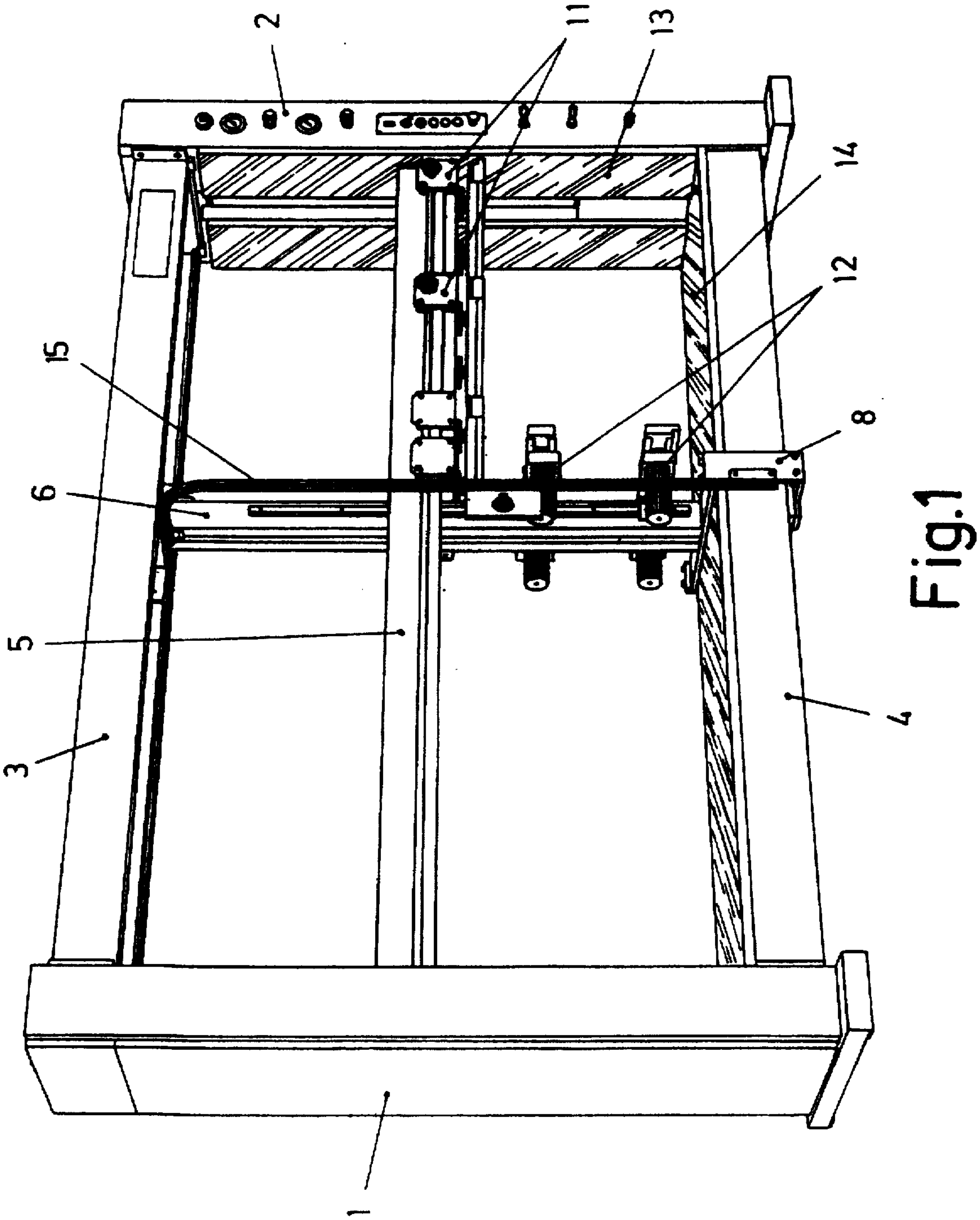
FIG. 1 represents a perspective view of an assembly of the recommended press.
Figure 2:
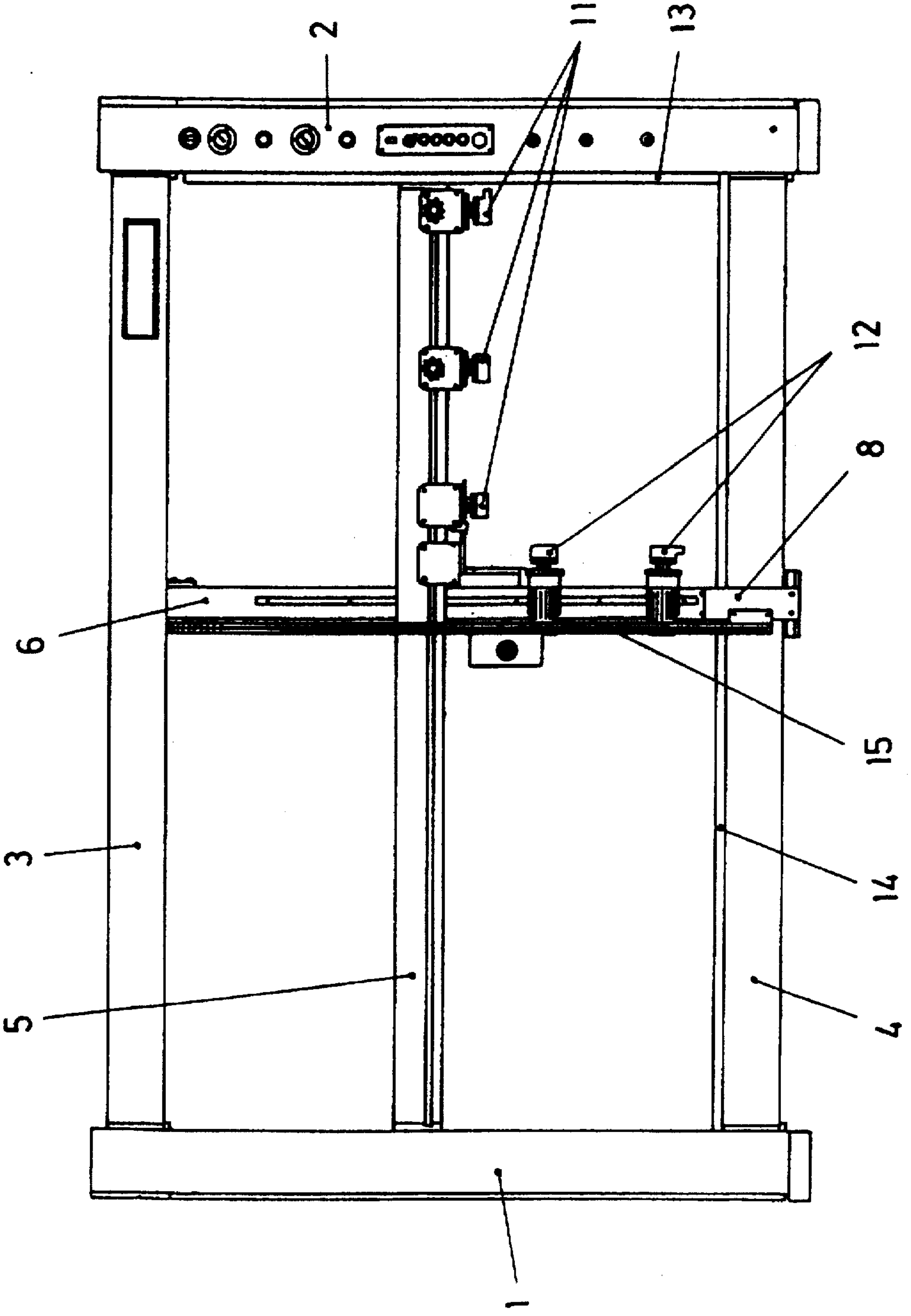
FIG. 2 is a front view of the press.
Figure 3:
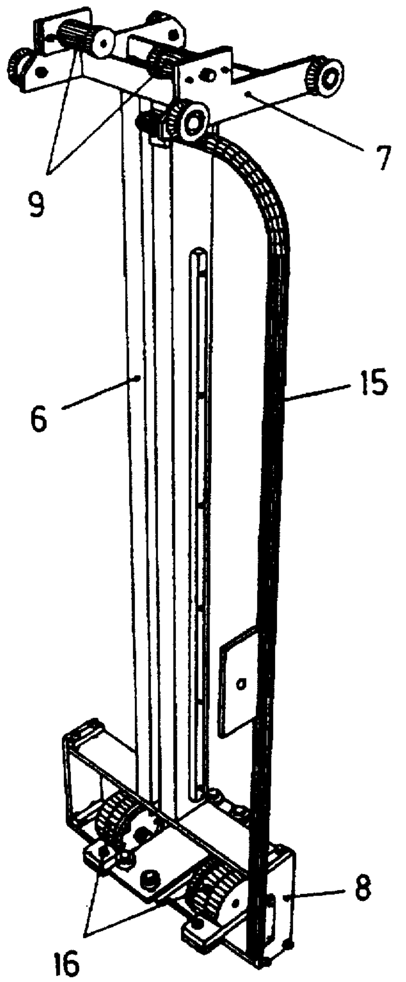
FIG. 3 is a perspective view of the vertical mobile crosspiece of the press.
Figure 4:
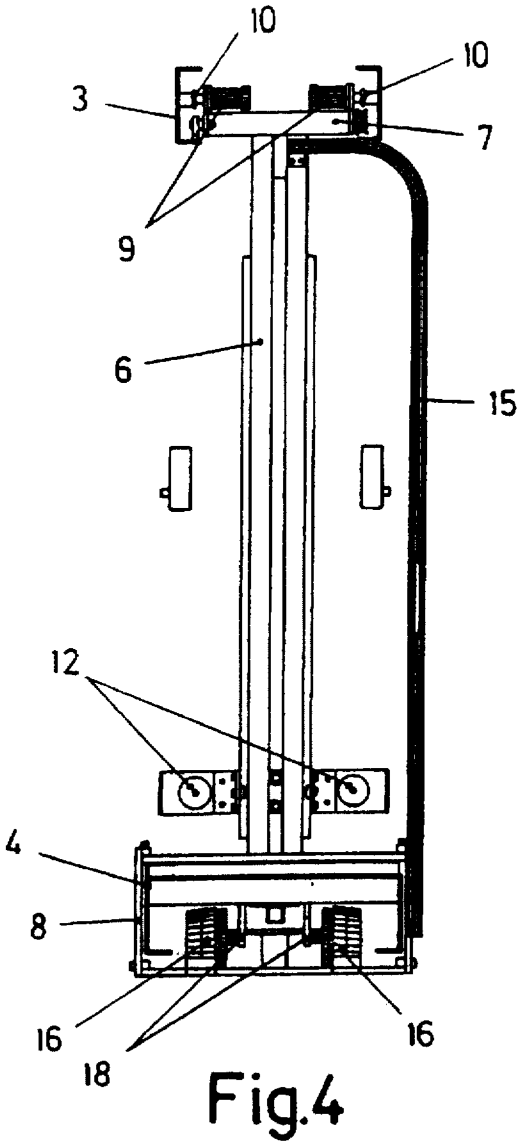
FIG. 4 is a side view of the aforementioned vertical mobile crosspiece, with representation of the upper and lower assembly guides of the same.
Figure 5:
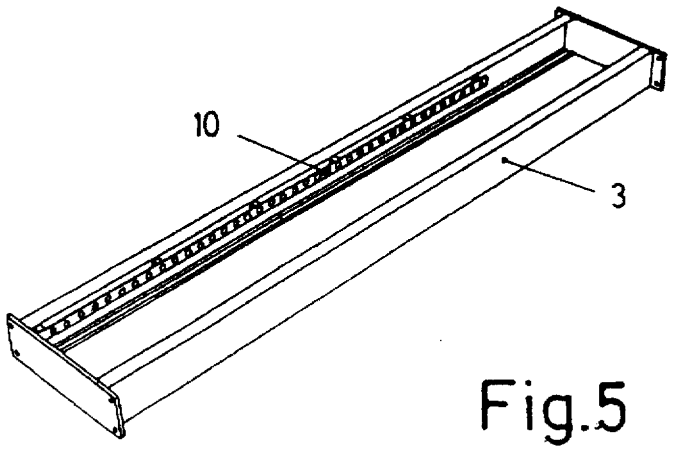
FIG. 5 is a perspective of the upper horizontal crossbar which serves as a guide for the vertical mobile crosspiece assembly mentioned above.

1. Lateral column.
2. Lateral column.
3. Upper crossbar.
4. Lower crossbar.
5. Horizontal mobile crosspiece.
6. Vertical mobile crosspiece.
7. Upper carriage.
8. Lower carriage.
9. Blocking cylinders.
10. Multibore plates.
11. Vertical pressure cylinders.
12. Horizontal pressure cylinders.
13. Support plate.
14. Support plate.
15. Handling bar.
16. Blocking cylinders.
17. Pressure bushing.
18. Support plates.

The object of the invention refers to a press for forming furniture bodies which are composed in the manner of a rectangular box, such as, for example, the cabinets of kitchen and bathroom furnishings.

Said press is made up by a determining structure of a rectangular frame which is composed of two vertical columns (1) and (2) and as many horizontal crossbars, one (3) in the upper part and another (4) in the lower part.

Between the two vertical columns (1) and (2) is incorporated in a mobile assembly a horizontal crosspiece (5), whose height is capable of being adjusted by mechanical driving means incorporated in columns (1) and (2) themselves, and which may be positioned selectively in a fixed manner at the desired height.

Between horizontal crossbars (3) and (4) there is also a vertical crosspiece (6), which is incorporated in a sliding assembly that allows it to be moved parallel to columns (1) and (2), with the possibility of selective placement between them at the desired distance.

In order to do so, this vertical mobile crosspiece (6) has an upper carriage (7), by means of which it is roll-mounted over upper horizontal crossbar (3), while below it has another carriage (8), by means of which it establishes a gliding connection with respect to lower horizontal crossbar (4).

Upper carriage (7) incorporates transversely arranged cylinders (9), by means of which temporary anchoring may be established on corresponding multibore plates (10), which allows aforementioned vertical mobile crosspiece (6), to be placed in a fixed block in selective positions of its movement between columns (1) and (2).

For its part, lower carriage (8) incorporates other cylinders (16), which incorporate at the end of their shaft a bushing (17) which is frontally concave, as can be observed in FIG. 7, said cylinder (16) facing laterally with respect to corresponding plates (18) which are longitudinally associated to crossbar (4), and which serve as guides in the movement of that lower carriage (8), at the same time constituting a support surface on which aforementioned cylinders (16) can press with their bushing (17) when they are operated, thus also permitting, in that lower part, the fixed blocking in a like manner of vertical mobile crosspiece (6) in the desired selective position.

As for horizontal crosspiece (5), it incorporates cylinders (11), arranged lengthwise toward the bottom, while vertical crosspiece (6) also incorporates cylinders (12), arranged lengthwise toward one of the lateral sides of the frame, such as for example toward column (2), whose internal face incorporates a plate (13) in perfect square with another plate (14) arranged on the internal face of lower crossbar (4).

With everything thus, in order to make the body of a piece of furniture, the mobility of crosspieces (5) and (6) allows them to be placed, in an initial adjustment, close to the dimension of the body to be made, for their incorporation in an assembled arrangement between cylinders (11) and (12) and plates (13) and (14), so that by means of a small extension of said cylinders (11) and (12) the pressure necessary for keeping the body held and compressed for the adequate union of its constituent elements can be achieved.

Pressure cylinders (11) and (12) may in turn be moved along the length of respective crosspieces (5) and (6), which allows those cylinder (11) and (12) to be adequately distributed in the operating area, so that the pressure exerted on the element to be made is uniform, independent of its width and length measurements.

Vertical crosspiece (6) provides for the incorporation of a bar (15) which is longitudinally arranged from top to bottom, secured above mounting carriages (7) and (8), said bar (15) determining a means of holding, for the mobility of the aforementioned crosspiece (6).

I claim:

1. Pneumatic press for forming furniture bodies, comprising:

a determining structure having a rectangular frame, including at least two vertical columns and at least upper and lower horizontal crossbars;

a horizontal crosspiece incorporated between said at least two columns which may be moved adjusted in height;

a vertical crosspiece incorporated between said upper and lower crossbars which may be moved along said crossbars; and said crosspieces being provided with corresponding cylinder means for applying force to a body within the press.

2. Pneumatic press for forming furniture bodies, according to claim 1, which further includes mechanical driving means included in said columns for adjusting the height of said horizontal crosspiece and fixing the height of said horizontal crosspiece at a selected height.

3. Pneumatic press for forming furniture bodies, according to claim 1, wherein said vertical crosspiece includes carriage means for roll-mounting said crosspiece on said upper horizontal crossbar, and a lower carriage means for providing a sliding connection with respect to said lower crossbar.

4. Pneumatic press for forming furniture bodies, according to claim 3, wherein said upper carriage means of said vertical crosspiece incorporates transversely arranged cylinders, whereby temporary anchoring may be carried out on respective multibore plates for selective position blocking of the aforementioned vertical crosspiece in different positions.

5. Pneumatic press for forming furniture bodies, according to claim 3, wherein said lower carriage of said vertical crosspiece incorporates cylinders, which are laterally facing each other with respect to guiding plates, on which they can establish a pressuring support by means of a frontally concave bushing incorporated at the end of their shaft, for the selective position blocking of the aforementioned vertical crosspiece in the desired positions.

6. Pneumatic press for forming furniture bodies, according to claim 1, wherein on an inside face of said column on one side, and on the inside face of said lower crossbar, respective plates are incorporated, arranged exactly perpendicular to one another, which correspondingly face said cylinder means provided on said crosspieces, for supporting furniture bodies to be pressed.

7. Pneumatic press for forming furniture bodies, according to claim 1, wherein said cylinder means are arranged on said crosspieces further including a mobile assembly means for permitting said cylinder means to be positioned along the length of said crosspieces so that the pressure on the corresponding element is uniform.

* * * * *

UNITED STATES PATENT AND TRADEMARK OFFICE

CERTIFICATE OF CORRECTION

PATENT NO. : 5,692,283

DATED : December 2, 1997

INVENTOR(S) : Juan Guarch OLIVE

It is certified that error appears in the above-identified patent and that said Letters Patent is hereby corrected as shown below:

Claim 1, line 7 delete "moved".

Signed and Sealed this

Thirteenth Day of January, 1998

Attest:

BRUCE LEHMAN

*Attesting Officer* *Commissioner of Patents and Trademarks*